March 29, 1938. W. S. BROWN 2,112,760
POWER REVERSE MECHANISM
Filed Jan. 25, 1936 2 Sheets-Sheet 1
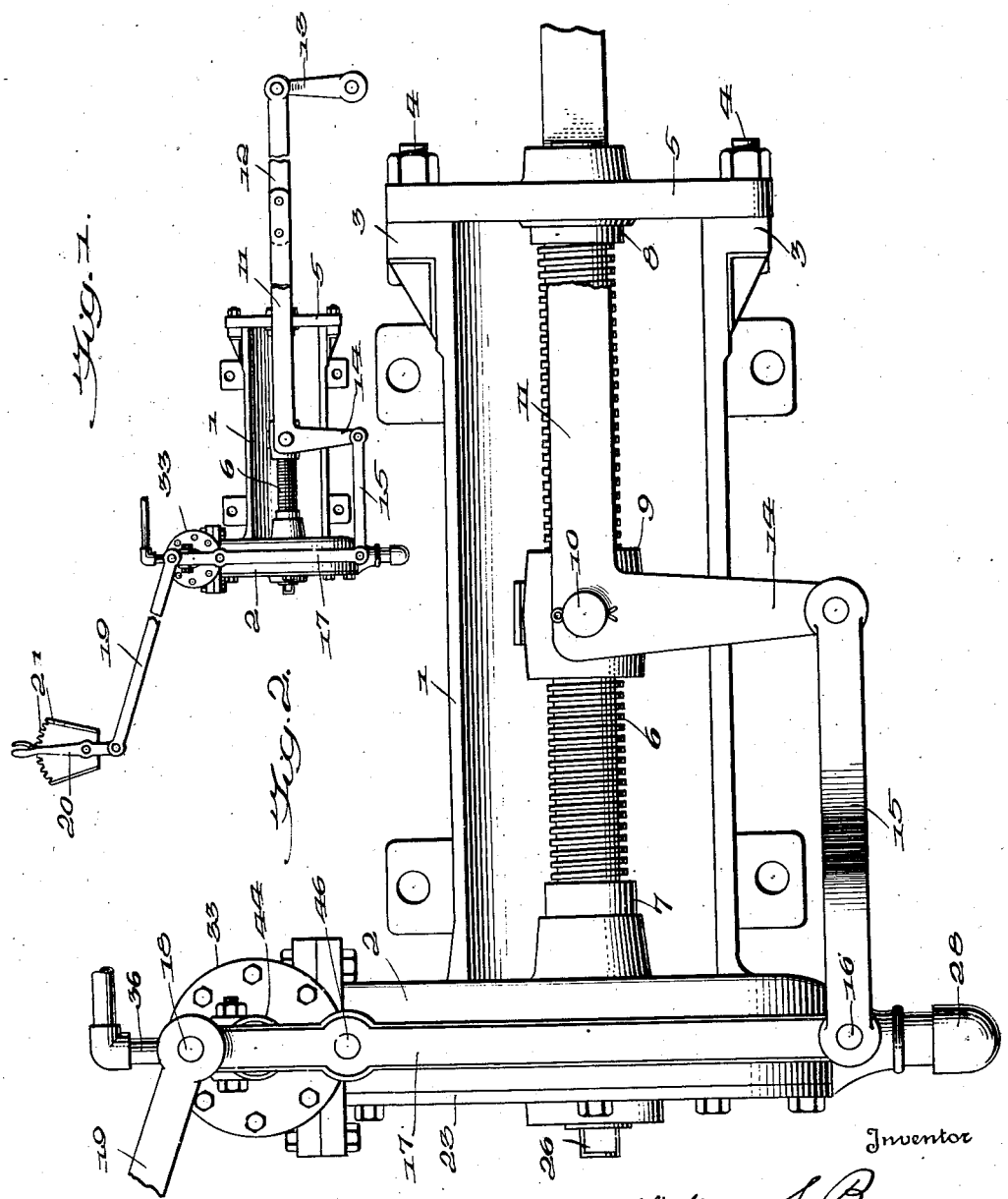
Inventor
William S. Brown
By Cyrus Kehr
his Attorney March 29, 1938.  W. S. BROWN  2,112,760
POWER REVERSE MECHANISM
Filed Jan. 25, 1936  2 Sheets-Sheet 2
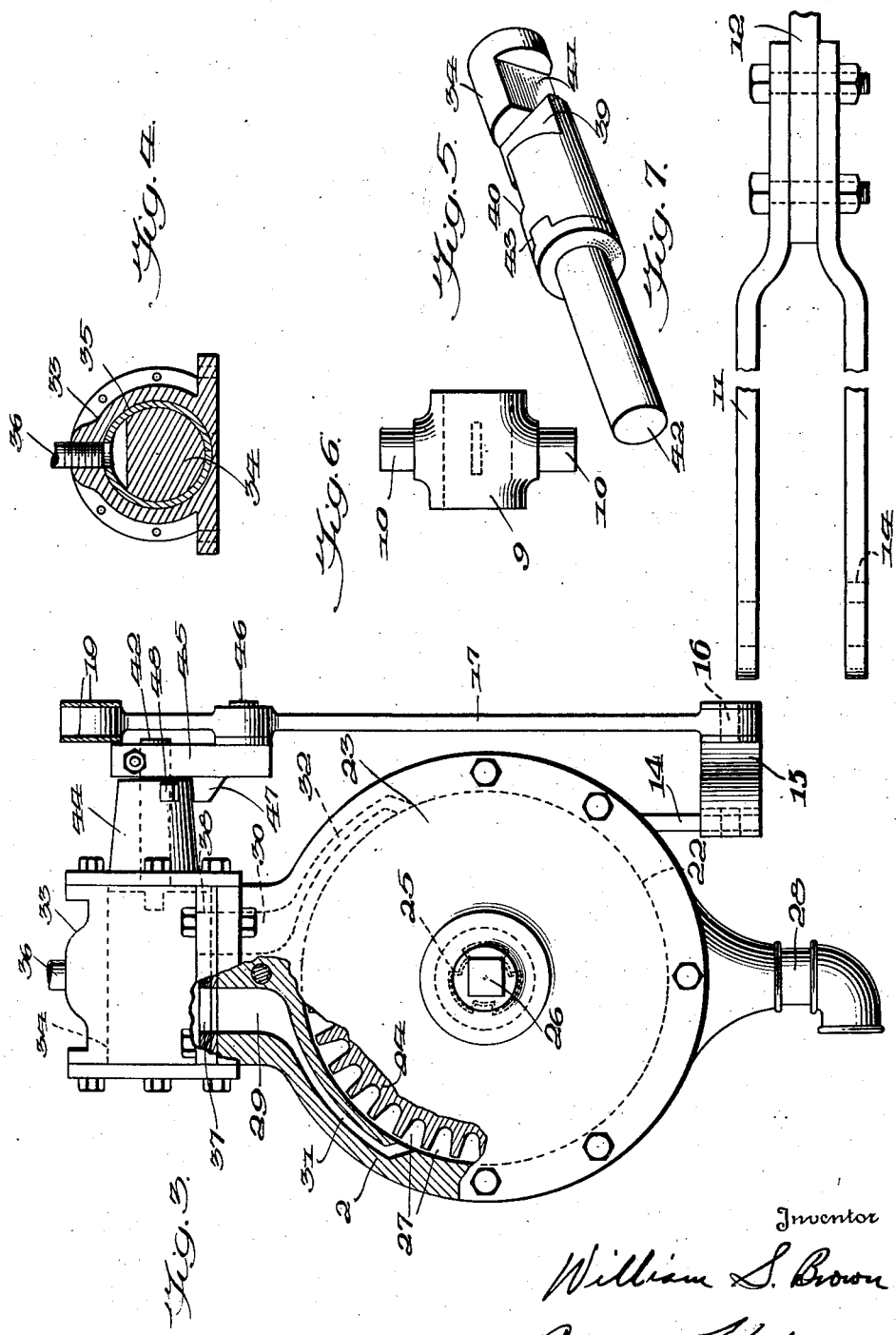
Inventor
William S. Brown
By Cyrus Kehr
his Attorney Patented Mar. 29, 1938

2,112,760

UNITED STATES PATENT OFFICE 2,112,760

POWER REVERSE MECHANISM

William S. Brown, Knoxville, Tenn.

Application January 25, 1936, Serial No. 60,860

4 Claims. (Cl. 121—41)

This invention relates to an improvement in power reverse mechanism, particularly for steam locomotives, and is an improvement on the power reverse mechanism set forth in my Patent No. 1,735,727, granted November 12, 1929.

The object of this invention is to simplify the mechanism used to operate the locomotive reverse gearing, to improve the construction and operation of the power device, and to simplify and improve the valve for controlling the supply of steam to the power device.

In my former patent, the casing structure required special guides for the movable block which was connected with the locomotive reverse gearing, but these guides are unnecessary according to my present invention inasmuch as the guide is mounted directly upon the power screw and the latter is connected directly with the rotor of the power device, with provision for adjustment to take up the play between the parts, the rotor being splined to the end of the screw, which latter projects through the rotor and is capable of being turned manually in case of emergency or for failure of the device to operate.

My present invention utilizes a rotary valve for controlling the admission of steam to the power device which eliminates the use of packing rings, and packing of the valve, greatly reduces leakage of steam, and improves the efficiency and control of the valve in many respects.

A preferred embodiment of my present invention is illustrated in the accompanying drawings, in which:

Fig. 1 is a side elevation of the power reverse mechanism.

Fig. 2 is a side elevation of the main portion of the mechanism and power device, enlarged with respect to Fig. 1.

Fig. 3 is an end elevation thereof, partly in section.

Fig. 4 is a vertical sectional view through the valve mechanism, removed.

Fig. 5 is a perspective view of the control valve, removed from its casing.

Fig. 6 is a plan view of the screw nut block.

Fig. 7 is a top plan view of the operating yoke.

Referring to Figs. 1 and 2, the main portion of the structure comprises a semi-cylindrical casing 1 adapted to be secured to a side of the locomotive as a support for the reverse mechanism. The casing 1 has an integral housing 2 at one end thereof, which is a part of the power device to be described hereinafter, while the opposite end of the casing 1 has diametrically opposite lugs 3, to which are secured bolts 4, for fastening an upstanding guide 5, the opposite ends of which fit over the bolts 4 and are permanently secured thereby.

A worm or screw 6 extends longitudinally in the casing 1 and has its opposite ends journaled at 7 and 8 respectively in the housing 2 and the guide 5. A nut block 9 is internally threaded and rides upon the screw 6. As shown in Figs. 2 and 6, the nut block 9 has oppositely projecting trunnions 10, upon which are pivoted opposite sides of a bell crank yoke 11, which straddles the guide 5 in embracing relation and free thereof, as shown in Fig. 1, and the outer end of the yoke 11 is secured to a connecting rod 12, which in turn is pivoted to the free end of lever 13, which is attached to the usual locomotive reverse gearing for operating the same.

One of the sides of the bell crank yoke 11 has a downwardly projecting arm 14 to which one end of a link 15 is pivoted. The opposite end of the link 15 is pivoted as at 16 to the lower end of a follow-up lever 17. The upper end of the lever 17 is pivoted at 18 to one end of a connecting link 19, the opposite end of which is pivotally secured to the usual reverse hand lever 20 provided with a quadrant 21 for regulating the setting thereof.

The housing 2 encloses a steam chamber 22 provided with a face plate 23 and within the housing is mounted a rotor 24 splined to the end of the screw 6, as at 25, to rotate the screw. The extreme end of the screw is squared as at 26, and projects through the face plate 23 to receive a crank for manual setting of the reverse gear in case of emergency or for failure of the reverse mechanism to operate satisfactorily.

The periphery of the rotor 24 is spaced slightly from the surrounding walls of the chamber 22 and has the usual pockets 27 therein adapted to receive steam for rotation of the rotor 24 by the power of steam acting on the rotor in the manner of the usual steam turbine. The bottom of the housing 2 is provided with a steam outlet 28, while the top portion of the housing is provided with inlet ports 29 and 30, which communicate with opposite sides of the chamber 22 through passageways 31 and 32, respectively, as shown in Fig. 3, in order to deliver steam to one side or the other of the chamber 22, and thus operate the rotor in either direction.

Mounted upon the housing 2 is a valve casing 33, within which a valve 34 operates. The valve 34 is a rotary valve and is enclosed within a bushing 35, as shown in Fig. 4. The casing 33 and bushing 35 are provided with registered steam inlet ports connected with an inlet pipe 36, and with registered ports 37 and 38, which are in open communication with the ports 29 and 30 in the housing 2.

The valve 34 is shown disassembled in Fig. 5, which illustrates a notch or passageway 39 adapted to register with the steam inlet ports, and on opposite sides of the rotary valve 34 are exhaust notches or passageways 40 and 41, both of which are in open communication with the passageway 39. The passageways 40 and 41 are adapted to be brought into registry, respectively, with the ports 37, 29, and 38, 30 in order to admit steam into one side or the other of the chamber 22, and thereby operate the rotor 24 in one direction or the other, according to the direction of steam admission, for rotating the screw 6.

The rotary valve 34 has a valve stem 42, which is separate from the valve, but has an interfitting connection 43 therewith for turning the valve. A valve stem guide 44 is secured to one side of the valve casing 33, and the valve stem 42 projects through the end of the guide 44 and has a crank arm 45 fixed thereon to turn the valve stem to rotate the valve 34. The free end of the crank arm 45 is pivoted at 46 to an intermediate portion of lever 17, which swings the crank arm. A lug 47 is fixed to the inner side of the crank arm 45 in position to engage stops 48 mounted on opposite sides of the guide 44, for limiting the movement of the crank arm 45 in opposite directions, and thereby limit the turning movement of the valve to positions which will bring the perspective ports and passageways into proper registry.

The operation of this power reverse mechanism will be obvious from the foregoing description taken in connection with my prior patent. If the locomotive engineer wishes to run the engine forward, the lever 20 is set forward (to the right in Fig. 1), which will move the link 19 backward, or to the left, and this in turn will swing the lever 17 about the pivot 16, which will move the pivot 46 and crank arm 45 to the left to rotate the valve 34. This movement of the valve will establish communication between the steam inlet pipe 36 and the passageway 31 through valve passageways 39 and 41 and through ports 37 and 29, which supply of steam will act to turn the rotor 24 in a counterclockwise direction, as viewed in Fig. 3, and thereby rotate the screw 6. This motion of the screw causes the nut block 9 to be moved forward, to the right in Fig. 2, which also pushes forward on the bell crank yoke 11 and link 12 to swing the lever 13 to the right, thereby setting the locomotive gearing for forward movement of the locomotive when the steam throttle is opened.

As the nut block 9 is moved to the right, this pulls forward on the lower end of the lever 17, swinging said lever about the pivot 18, and thereby restoring the crank arm 45 to a central position, which likewise turns the valve 34 to a position which cuts off communication from the steam inlet pipe 36 to the power device, and thus stops rotation of the screw 6 after a predetermined degree of movement, depending upon the extent of initial movement of the lever 20.

It is obvious that the opposite setting of the lever 20 will shift the parts in the opposite direction to supply steam through the passageway 32 to the opposite side of the rotor 24, and thereby return the mechanism to a neutral position or for reverse movement of the locomotive when the throttle is opened. Any setting of the lever 20, other than central, causes a movement of the nut block 9 a predetermined distance, according to degree of movement of the lever 20.

When the crank arm 45 is restored to a central position, the passageways 40 and 41 are out of registry with the ports 37, 29, and 38, 30 so that steam is not admitted to either side of the chamber 22, and the rotor 24 remains stationary until the lever 20 is moved in one direction or the other.

The valve is of simple form and requires no packing inasmuch as it is fitted to the bushing 35 and the casing. This operating mechanism for the reverse gearing is non-creepable, but may be simply operated whenever the engine is under steam. There is no danger of the engine moving in the opposite direction from that set by the reverse mechanism or of shifting of the reverse mechanism to another position. When the engine is not under steam, the reverse gearing may be set manually, as explained above.

I claim:

1. In power reverse mechanism, the combination of a frame structure having a guide at an end portion thereof, a worm having opposite end portions journaled in said frame structure and guide respectively, power means for rotating the worm and having a control valve and a follow-up lever, a nut threaded on the worm and supported and guided solely thereby independently of the frame structure, a rigid yoke pivoted to opposite sides of said nut and embracing the guide and adapted to be connected at one end portion with locomotive reverse gearing, and a link connecting the other end portion of said yoke with the follow-up lever.

2. In power reverse mechanism, the combination of a frame structure having a guide at an end portion thereof, a worm having opposite end portions journaled in said frame structure and guide respectively, power means for rotating the worm and having a control valve and a follow-up lever, a nut threaded on the worm and supported and guided solely thereby independently of the frame structure, a rigid yoke pivoted to opposite sides of said nut and embracing the guide and adapted to be connected at one end portion with locomotive reverse gearing, said yoke having an arm projecting laterally from the extreme opposite end of said yoke, and a link connecting said arm with the follow-up lever.

3. In power reverse gearing, the combination of a semi-cylindrical casing having a guide extending approximately diametrically across an end thereof, a worm having opposite end portions journaled in said frame structure and guide respectively, power means for rotating the worm, a rotatable valve for controlling the power means and having a laterally offset crank pin, a follow-up lever pivotally supported intermediate its ends on said crank-pin, a nut threaded on the worm and supported and guided solely thereby independently of the casing, a rigid yoke pivoted to opposite sides of said nut and embracing the guide and adapted to be connected at one end with locomotive reverse gearing, an arm projecting laterally from the extreme opposite end of one side of said yoke, and a link connecting said arm with an end of the follow-up lever, the opposite end of said follow-up lever being adapted to be connected with a hand reverse lever.

4. In power reverse mechanism, the combination of a casing having an integral housing at one end thereof, a guide extending transversely of said casing at the opposite end thereof, power means including a rotor in the housing and a control valve having a follow-up lever, a single power screw member journaled in the casing and guide and having an end extending through the housing with a splined connection with the rotor and with the extreme end thereof externally of the housing squared to receive a crank, a nut threaded on the screw member and supported and guided solely thereby independently of the casing, a rigid yoke embracing the guide and pivoted at one end to opposite sides of said nut and adapted to be connected at the opposite end thereof with locomotive reverse gearing, and a link connecting the follow-up lever with said yoke.

WILLIAM S. BROWN.